(12) United States Patent  (10) Patent No.: US 9,152,801 B2
Cooke  (45) Date of Patent: Oct. 6, 2015

(54) CRYPTOGRAPHIC SYSTEM OF SYMMETRIC-KEY ENCRYPTION USING LARGE PERMUTATION VECTOR KEYS

(71) Applicant: Steven W. Cooke, Chesterfield, MO (US)

(72) Inventor: Steven W. Cooke, Chesterfield, MO (US)

( * ) Notice: Subject to any disclaimer, the term of this patent is extended or adjusted under 35 U.S.C. 154(b) by 0 days.

(21) Appl. No.: 14/250,916

(22) Filed: Apr. 11, 2014

(65) Prior Publication Data

US 2014/0223194 A1  Aug. 7, 2014

Related U.S. Application Data

(63) Continuation-in-part of application No. 13/862,055, filed on Apr. 12, 2013, now Pat. No. 8,897,440.

(60) Provisional application No. 61/665,703, filed on Jun. 28, 2012.

(51) Int. Cl.
  *H04K 1/00* (2006.01)
  *G06F 21/60* (2013.01)
  *H04L 9/06* (2006.01)
  *G06F 21/12* (2013.01)

(52) U.S. Cl.
  CPC ............ *G06F 21/602* (2013.01); *H04L 9/0618* (2013.01); *G06F 21/125* (2013.01)

(58) Field of Classification Search
  CPC .... G06F 21/125; G06F 21/602; H04L 9/0618
  See application file for complete search history.

(56) References Cited

U.S. PATENT DOCUMENTS

| 5,058,164 | A  | * | 10/1991 | Elmer et al. ................... 713/190 |
|---|---|---|---|---|
| 6,647,495 | B1 | * | 11/2003 | Takeuchi et al. ............... 713/189 |
| 6,675,298 | B1 |   | 1/2004  | Folmsbee |
| 2002/0046345 | A1 | * | 4/2002 | Takeuchi et al. ............... 713/190 |
| 2003/0236986 | A1 | * | 12/2003 | Cronce et al. ................. 713/189 |
| 2006/0026430 | A1 | * | 2/2006 | Luo ............................... 713/176 |
| 2006/0104438 | A1 |   | 5/2006 | Giraud |
| 2008/0130885 | A1 | * | 6/2008 | Yamamoto et al. ........... 380/201 |
| 2008/0317243 | A1 | * | 12/2008 | Ramprashad ................... 380/29 |
| 2009/0060197 | A1 |   | 3/2009 | Taylor et al. |
| 2010/0303229 | A1 | * | 12/2010 | Unruh ............................. 380/28 |
| 2010/0313188 | A1 | * | 12/2010 | Asipov et al. ................. 717/139 |

* cited by examiner

*Primary Examiner* — Techane Gergiso
(74) *Attorney, Agent, or Firm* — Senniger Powers LLP

(57) ABSTRACT

A method for use in encrypting data using a computer. The method comprises receiving data to be encrypted, defining a set of byte codes comprising user byte codes, storing a transformation vector defined from the set of byte codes, retrieving the transformation vector from the memory, transforming a block of the data from the data to be encrypted, translating values of the user byte codes from the block of data across the transformation vector, randomly selecting one or more reversible operations to perform, performing the reversible operations during the translation of the values of the user byte codes from the block of data, and inserting the translated values of the user byte codes into an encrypted block of data.

17 Claims, 11 Drawing Sheets

FIG. 4

| User Byte Codes | | | | | | | | Meta Byte Codes | | | | Dead Byte Codes | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |

FIG. 5

Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 13 | 1 | 10 | 0 | 8 | 6 | 12 | 7 | 2 | 14 | 4 | 9 | 3 | 5 | 11 | 15 |

FIG. 6

Reverse Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 3 | 1 | 8 | 12 | 10 | 13 | 5 | 7 | 4 | 11 | 2 | 14 | 6 | 0 | 9 | 15 |

FIG. 7

| 5 | 4 | 7 | 1 | 3 | 2 | 0 | 4 | 6 | 6 |
|---|---|---|---|---|---|---|---|---|---|

FIG. 8

| data | | meta byte code | | data | | meta byte code | | data | | | meta byte code | | data | |
|---|---|---|---|---|---|---|---|---|---|---|---|---|---|---|
| 6 | 8 | 14 | 6 | 10 | 13 | 8 | 14 | 10 | 7 | 1 | 0 | 14 | 2 | 12 | 12 |

FIG. 9

Set of Multiple Key Vectors

|       | 0  | 1  | 2  | 3  | 4  | 5  | 6  | 7  | 8  | 9  | 10 | 11 | 12 | 13 | 14 | 15 |
|-------|----|----|----|----|----|----|----|----|----|----|----|----|----|----|----|----|
| Key 0 | 13 | 1  | 10 | 0  | 8  | 6  | 12 | 7  | 2  | 14 | 4  | 9  | 3  | 5  | 11 | 15 |
| Key 1 | 7  | 12 | 9  | 4  | 10 | 13 | 3  | 5  | 14 | 11 | 2  | 0  | 6  | 15 | 8  | 1  |
| Key 2 | 7  | 8  | 10 | 13 | 9  | 1  | 3  | 15 | 6  | 5  | 12 | 0  | 2  | 14 | 4  | 11 |
| Key 3 | 15 | 5  | 2  | 6  | 13 | 1  | 14 | 9  | 10 | 8  | 4  | 0  | 7  | 12 | 11 | 3  |

FIG. 10

Transformation Vector

| 0  | 1 | 2  | 3 | 4 | 5 | 6  | 7 | 8 | 9  | 10 | 11 | 12 | 13 | 14 | 15 |
|----|---|----|---|---|---|----|---|---|----|----|----|----|----|----|----|
| 13 | 1 | 10 | 0 | 8 | 6 | 12 | 7 | 2 | 14 | 4  | 9  | 3  | 5  | 11 | 15 |

Key 1 Vector

| 0 | 1  | 2 | 3 | 4  | 5  | 6 | 7 | 8  | 9  | 10 | 11 | 12 | 13 | 14 | 15 |
|---|----|---|---|----|----|---|---|----|----|----|----|----|----|----|----|
| 7 | 12 | 9 | 4 | 10 | 13 | 3 | 5 | 14 | 11 | 2  | 0  | 6  | 15 | 8  | 1  |

New Transformation Vector

| 0  | 1  | 2 | 3 | 4  | 5 | 6 | 7 | 8 | 9 | 10 | 11 | 12 | 13 | 14 | 15 |
|----|----|---|---|----|---|---|---|---|---|----|----|----|----|----|----|
| 15 | 12 | 2 | 7 | 14 | 3 | 6 | 5 | 9 | 8 | 10 | 11 | 4  | 13 | 0  | 1  |

FIG. 11

Input Data

| 4 | 3 | 6 | 6 | 5 | 4 | 7 | 1 | 3 | 2 | 0 | 5 | 8 | 6 | 3 | 0 |
|---|---|---|---|---|---|---|---|---|---|---|---|---|---|---|---|

Hash Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 13 | 1 | 10 | 0 | 8 | 6 | 12 | 7 | 2 | 14 | 4 | 9 | 3 | 5 | 11 | 15 |

Hashed Input Data

| 6 | 3 | 3 | 8 | 0 | 6 | 4 | 1 | 5 | 5 | 6 | 3 | 7 | 4 | 2 | 0 |
|---|---|---|---|---|---|---|---|---|---|---|---|---|---|---|---|

FIG. 12

| Random Bytes | | | | Message Data | | | | | | | | EOM code | Random Bytes | | |
|---|---|---|---|---|---|---|---|---|---|---|---|---|---|---|---|
| 4 | 3 | 6 | 6 | 5 | 4 | 7 | 1 | 3 | 2 | 0 | 5 | 8 | 6 | 3 | 0 |

FIG. 13

| SYNC | LOC | | Data Bytes | | |
|---|---|---|---|---|---|
| 9 | 14 | 11 | 10 | 13 | 12 |

FIG. 14

New Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 5 | 1 | 4 | 13 | 2 | 12 | 3 | 7 | 10 | 11 | 8 | 14 | 0 | 6 | 9 | 15 |

FIG. 15

| SYNC | LOC | | Data Bytes | | | TRAN | LOC | | Data Bytes | | |
|------|-----|---|------------|---|---|------|-----|---|------------|---|---|
| 9 | 14 | 11 | 10 | 13 | 12 | 4 | 13 | 11 | 3 | 2 | 1 |

FIG. 16

Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 5 | 1 | 4 | 13 | 2 | 12 | 3 | 7 | 10 | 11 | 8 | 14 | 0 | 6 | 9 | 15 |

Key 2 Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 7 | 8 | 10 | 13 | 9 | 1 | 3 | 15 | 6 | 5 | 12 | 0 | 2 | 14 | 4 | 11 |

New Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 8 | 9 | 14 | 10 | 2 | 13 | 15 | 12 | 0 | 6 | 4 | 7 | 3 | 5 | 11 |

FIG. 17

Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 8 | 9 | 14 | 10 | 2 | 13 | 15 | 12 | 0 | 6 | 4 | 7 | 3 | 5 | 11 |

Key 2 Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 7 | 8 | 10 | 13 | 9 | 1 | 3 | 15 | 6 | 5 | 12 | 0 | 2 | 14 | 4 | 11 |

New Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 8 | 6 | 5 | 4 | 12 | 10 | 14 | 11 | 2 | 7 | 3 | 9 | 15 | 13 | 1 | 0 |

FIG. 18

| SYNC | LOC | Data Bytes | | | TRAN | LOC | Data Bytes | | TRAN | Data Bytes |
|------|-----|---|---|---|------|-----|---|---|------|---|
| 9 | 14 | 11 | 10 | 13 | 12 | 4 | 13 | 11 | 3 | 2 | 1 | 8 | 4 | 2 |

| LOC | TRAN | Data Bytes | | |
|-----|------|---|---|---|
| 0 | 7 | 6 | 9 | 11 | 12 |

FIG. 19

Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 8 | 6 | 5 | 4 | 12 | 10 | 14 | 11 | 2 | 7 | 3 | 9 | 15 | 13 | 1 | 0 |

Key 0 Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 13 | 1 | 10 | 0 | 8 | 6 | 12 | 7 | 2 | 14 | 4 | 9 | 3 | 5 | 11 | 15 |

New Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 2 | 12 | 6 | 8 | 3 | 4 | 11 | 9 | 10 | 7 | 0 | 14 | 15 | 5 | 1 | 13 |

FIG. 20

| SYNC | LOC | Data Bytes | | | TRAN | LOC | Data Bytes | TRAN | Data Bytes |
|---|---|---|---|---|---|---|---|---|---|
| 9 | 14 | 11 | 10 | 13 | 12 | 4 | 13 | 11 | 3 | 2 | 1 | 8 | 4 | 2 |

| LOC | TRAN | Data Bytes | | LOC | Data Bytes | | TRAN | Data Bytes | | LOC |
|---|---|---|---|---|---|---|---|---|---|---|
| 0 | 7 | 6 | 9 | 11 | 12 | 7 | 6 | 4 | 4 | 3 | 8 | 10 | 2 | 7 | 4 |

| Data Bytes |
|---|
| 11 |

FIG. 21

Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 2 | 12 | 6 | 8 | 3 | 4 | 11 | 9 | 10 | 7 | 0 | 14 | 15 | 5 | 1 | 13 |

Key 2 Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 7 | 8 | 10 | 13 | 9 | 1 | 3 | 15 | 6 | 5 | 12 | 0 | 2 | 14 | 4 | 11 |

New Transformation Vector

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 10 | 2 | 3 | 6 | 13 | 9 | 0 | 5 | 12 | 15 | 7 | 6 | 11 | 1 | 8 | 14 |

FIG. 22

| SYNC | LOC | Data Bytes | | TRAN | LOC | Data Bytes | | TRAN | Data Bytes | |
|------|-----|------------|---|------|-----|------------|---|------|------------|---|
| 9 | 14 | 11 | 10 | 13 | 12 | 4 | 13 | 11 | 3 | 2 | 1 | 8 | 4 | 2 |

| LOC | TRAN | Data Bytes | | LOC | Data Bytes | | TRAN | Data Bytes | LOC | |
|-----|------|------------|---|-----|------------|---|------|------------|-----|---|
| 0 | 7 | 6 | 9 | 11 | 12 | 7 | 6 | 4 | 4 | 3 | 8 | 10 | 2 | 7 | 4 |

| Data Bytes | TRAN | LOC | Data Bytes | | |
|------------|------|-----|------------|---|---|
| 11 | 0 | 6 | 15 | 15 | 9 | 0 | 6 |

CRYPTOGRAPHIC SYSTEM OF SYMMETRIC-KEY ENCRYPTION USING LARGE PERMUTATION VECTOR KEYS

REFERENCE TO RELATED APPLICATIONS

This application is a continuation-in-part of U.S. application Ser. No. 13/862,055, filed Apr. 12, 2013, which claims the benefit of U.S. Provisional Application No. 61/665,703, filed Jun. 28, 2012. The entire contents of the above applications are hereby incorporated by reference.

FIELD OF THE INVENTION

The present invention generally relates to the field of data encryption and decryption.

BACKGROUND OF THE INVENTION

Symmetric key encryption is a form of encryption where the same key information is used to encrypt and decrypt the desired data. Symmetric key encryption can be used on either a stream of data or discrete blocks of data. Symmetric key encryption is known to be faster and stronger in general than alternative asymmetric key encryption methods and can be used whenever it is possible to ensure the security of the key information among the parties who are allowed access.

There have been several different standards of symmetric key encryption. The Data Encryption Standard (DES) was designed by IBM in the 1970's. DES is a block encryption standard with discrete blocks of data of 64 bits and a key size of 56 bits. In some form, DES was considered the standard encryption method until it was replaced by the Advanced Encryption Standard (AES). DES is now considered insecure based on its relatively small key size and the fact that it can be reliably broken in short periods of time using modern computer hardware. AES has a block size of 128 bits and a key size of 128, 192, or 256 bits. It was first published in the late 1990's, and is currently considered a standard for symmetric key encryption and is considered by the U.S. government to be sufficient to protect classified information.

In current encryption systems, there is a tradeoff between the strength of the encryption against breaking and the cost of implementing the encryption method. In many cases, the strength of the encryption method is heavily reliant on the size of the key used, as in DES and AES. In the most extreme case, a symmetric key encryption can be made unbreakable by using what is known as a one-time pad (OTP). In an OTP encryption, the key used is perfectly random, is the same length as the data being encrypted, and can only be used once. Assuming that the key is secret and known only to the allowed parties, an OTP encryption is considered mathematically unbreakable. However, the cost of implementing an OTP is high, requiring that each party share very large keys using a sufficiently secret method for each message that they want to send.

A good symmetric key encryption method has a reasonable cost for sharing and storing of the key information and running the encryption algorithm, but it must also result in a strong encryption that is not realistically breakable.

SUMMARY OF THE INVENTION

Aspects of the invention permit encrypting and decrypting blocks of data using symmetric key encryption while allowing for a variety of additional operations to be performed during the encryption and decryption in order to increase the strength of the encryption. The complexity and strength of the encryption can be increased through these additional operations in many ways, including using more than one key at different points throughout the encryption. By increasing the number of keys used in the encryption the difficulty in guessing the correct key increases exponentially, but the additional cost of key storage increases linearly, such that the difficulty in breaking the encryption increases much more quickly than the additional cost of including more keys.

Briefly, a method for encrypting data using a computer includes receiving data to be encrypted, defining a set of byte codes associated with the data, and storing a transformation vector defined from the set of byte codes. According to the method, the set of byte codes comprises user byte codes representative of the data to be encrypted. The method further comprises retrieving the transformation vector from the memory and transforming a block of the data from the data to be encrypted. The transformation vector includes one of each of the user byte codes arranged in a random order. Further, transforming according to the method includes translating values of the user byte codes from the block of data across the transformation vector, performing the reversible operations during the translation of the values of the user byte codes from the block of data, and inserting the translated values of the user byte codes into an encrypted block of data.

In an aspect, a non-transitory computer-readable medium having computer-executable instructions stored thereon encrypts data. The instructions, when executed by a computer, cause the computer to perform a method comprising receiving data to be encrypted, defining a set of byte codes and, storing a transformation vector defined from the set of byte codes. The method further comprises retrieving the transformation vector from the memory and transforming a block of the data from the data to be encrypted. Transforming in accordance with the instructions includes translating values of the user byte codes from the block of data across the transformation vector, randomly selecting one or more reversible operations, performing the reversible operations during the translation of the values of the user byte codes from the block of data, inserting the translated values of the user byte codes into an encrypted block of data.

Another method embodying aspects of the invention decrypts data. The method includes receiving, by a computer, previously encrypted data to be decrypted, storing, in a memory, a set of byte codes associated with the data to be decrypted that were used to encrypt the data to be decrypted, and defining a set of byte codes, namely, user byte codes. The method also includes storing a transformation vector defined from the set of byte codes in the memory. In this instance, the transformation vector includes one of each of the user byte codes arranged in a random order and was used to encrypt the data to be decrypted. Further, the method includes retrieving the transformation vector from the memory and transforming a block of data from the data to be decrypted. According to the method, transforming includes translating values of the user byte codes from the block of data across the transformation vector. The translating reverses a translation of the user byte codes during encryption across the transformation vector. The decryption method also uses the same seed and random number generator as the encryption method, such that the reversible operations used by the encryption method are known to the decryption method and the decryption method can reverse them at the same intervals as they occurred during the encryption method.

This Summary is provided to introduce a selection of concepts in a simplified form that are further described below in the Detailed Description. This Summary is not intended to

BRIEF DESCRIPTION OF THE DRAWINGS

FIG. 4 is an example of the distribution of user byte codes, meta byte codes, and dead byte codes in a set of byte codes.

FIG. 5 is an example of a transformation vector.

FIG. 6 is an example of the corresponding reverse transformation vector of the transformation vector in FIG. 5.

FIG. 7 is an example of input into the encryption process.

FIG. 8 is the result of an example encryption process using a location changing meta byte code.

FIG. 9 is an example of a list of multiple key vectors for use in the encryption process.

FIG. 10 is an example of the translation of a transformation vector across a key vector to create a new transformation vector. The transformation vector, key vector, and resulting new transformation vector are shown.

FIG. 11 is an example of an initial hash function of the input data. The input data, the hash vector used, and the resulting hashed input data are shown.

FIG. 12 is an example of input data into the process including random bytes as a leader to the real data, an end of message meta byte code, and random bytes as a tail to fill up the data block.

FIG. 13 is the contents of the encrypted data block part of the way through the exemplary encryption process walkthrough.

FIG. 14 is the resulting new transformation vector created by translating the transformation vector in FIG. 5 across itself.

FIG. 15 is the contents of the encrypted data block part of the way through the exemplary encryption process walkthrough.

FIG. 16 is an example of the translation of a transformation vector across a key vector to create a new transformation vector. The transformation vector, key vector, and resulting new transformation vector are shown.

FIG. 17 is an example of the translation of a transformation vector across a key vector to create a new transformation vector. The transformation vector, key vector, and resulting new transformation vector are shown.

FIG. 18 is the contents of the encrypted data block part of the way through the exemplary encryption process walkthrough.

FIG. 19 is an example of the translation of a transformation vector across a key vector to create a new transformation vector. The transformation vector, key vector, and resulting new transformation vector are shown.

FIG. 20 is the contents of the encrypted data block part of the way through the exemplary encryption process walkthrough.

FIG. 21 is an example of the translation of a transformation vector across a key vector to create a new transformation vector. The transformation vector, key vector, and resulting new transformation vector are shown.

FIG. 22 is the contents of the encrypted data block at the end of the exemplary encryption process walkthrough.

Corresponding reference characters indicate corresponding parts throughout the drawings.

DESCRIPTION OF THE PREFERRED EMBODIMENTS

Figure 1:
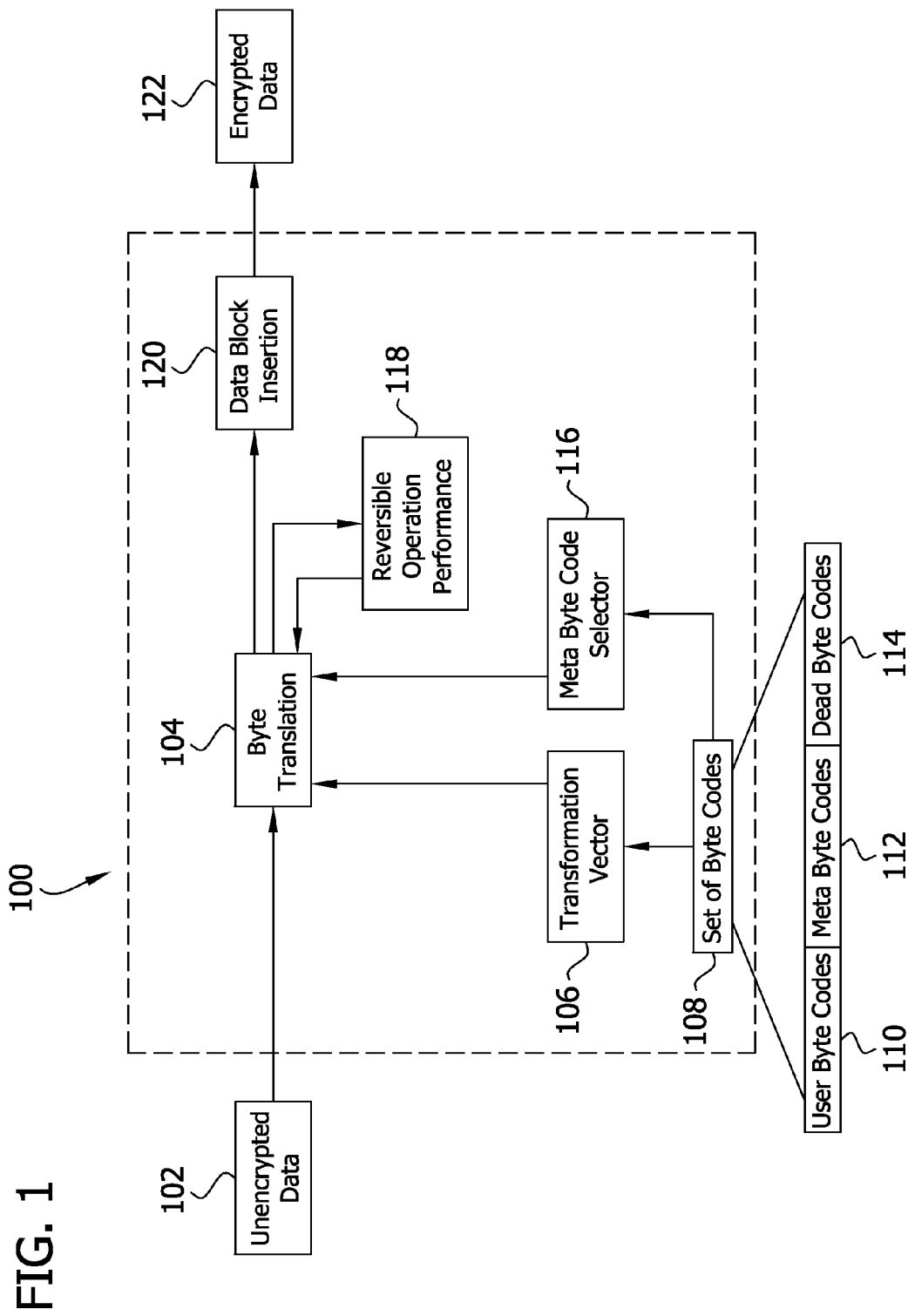
FIG. 1 is a function block representation of an implementation of the encryption/decryption process and the relations between the sub-processes thereof.

Aspects of the invention are directed to encrypting and decrypting blocks of data using symmetric key encryption. FIG. 1 shows a function block diagram that displays the various parts of the encryption and the relationships between the parts. This is an exemplary way to visualize the encryption process. It is not required for an implementation of this encryption method to follow this diagram exactly.

The general body of the encryption process 100 is shown, containing all the elements necessary to encrypt the data. The unencrypted data 102 enters the encryption process 100 and begins to be translated according to the byte translation sub-process 104. The byte translation sub-process 104 uses the transformation vector 106 in translating the bytes of the unencrypted data and it determines if a meta byte code has been selected by the meta byte code selector sub-process 116. The translation vector 106 is made up of a random permutation of the bytes in the set of byte codes 108 used by the encryption process. The set of byte codes 108 includes the user byte codes 110, which are the codes that make up the data in the block of data, the meta byte codes 112, which are codes that indicate a reversible operation should be performed during encryption/decryption, and the dead byte codes 114, which are not used for either use and will generally indicate failure of the encryption/decryption process. The meta byte code selector sub-process 116 will randomly choose meta byte codes to supply to the byte translator sub-process 104 at random points to cause the encryption process 100 to enter the reversible operation sub-process 118. The meta byte codes 112 chosen are translated in the same manner as the data being translated and are placed between bytes of data to indicate when a reversible operation is performed. When the reversible operation is performed, the parameters of the encryption process are changed in a way that is not reflected in any of the key information (the transformation vector 106 and the set of byte codes 108). All of the translated bytes from the byte translation sub-process 104 are then inserted into a data block as represented by the data block insertion sub-process 120. Once the insertion is complete, the data is considered encrypted data 122.

Figure 2:
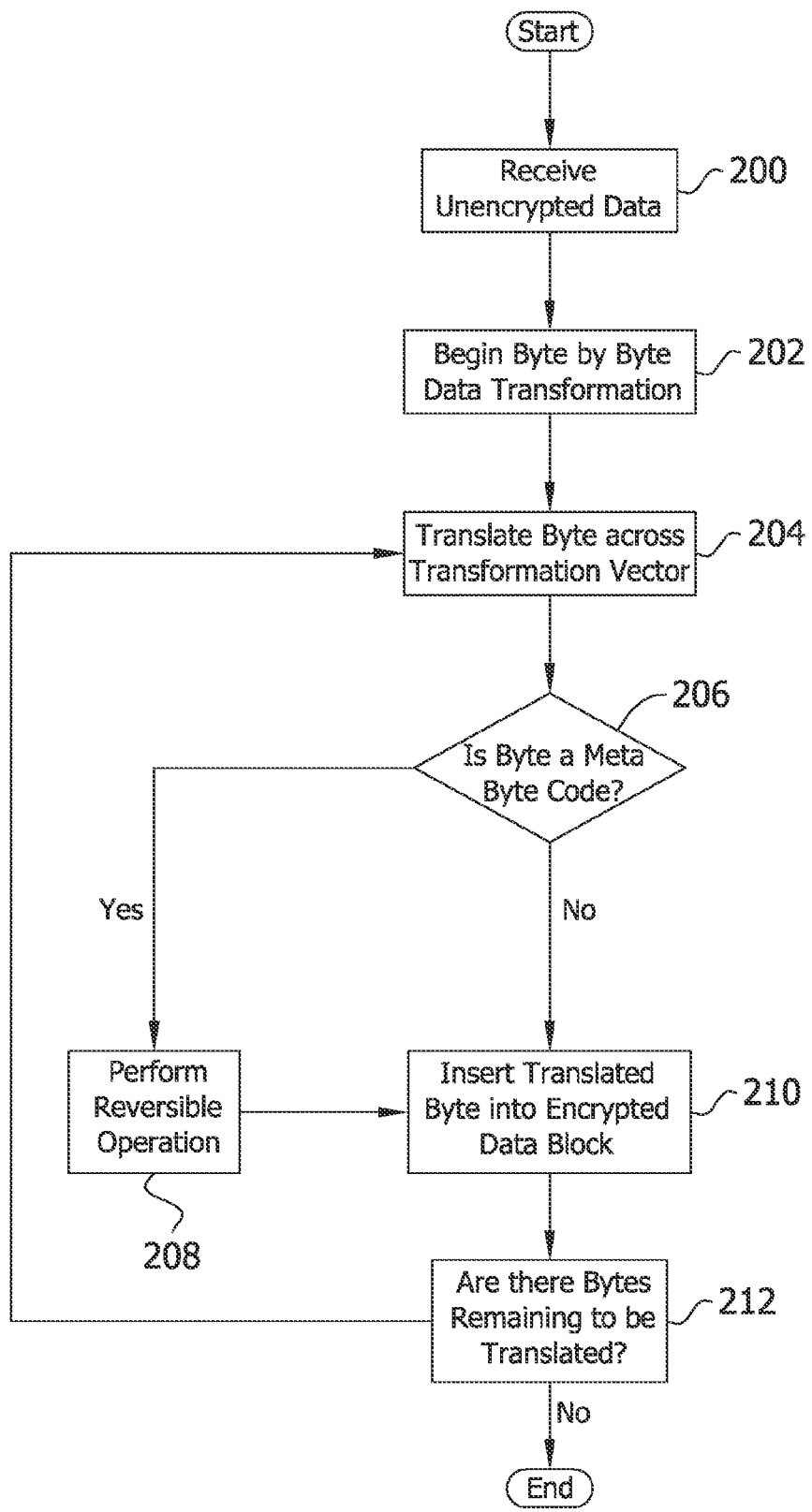
FIG. 2 is a flowchart showing the steps of an exemplary encryption process.

FIG. 2 shows a flowchart of the steps of the encryption method. At step 200, the unencrypted data is received. At step 202, the transformation of that unencrypted data begins, translating the data byte by byte. At this step, the set of byte codes and the transformation vector from FIG. 1 have already been determined. At step 204, the next byte in the data is translated across the transformation vector. At step 206, the process determines whether the most recent byte translated was a meta byte code. If so, it indicates a reversible operation is performed (step 208). After step 208 in the case of a meta byte code, or after step 206 in the case of a non-meta byte code, the translated byte is inserted into an encrypted data block (step 210). At step 212, the process determines whether there are more bytes to translate. If so, it returns to step 204 to translate the next byte. If not, the encryption process is complete.

Figure 3:
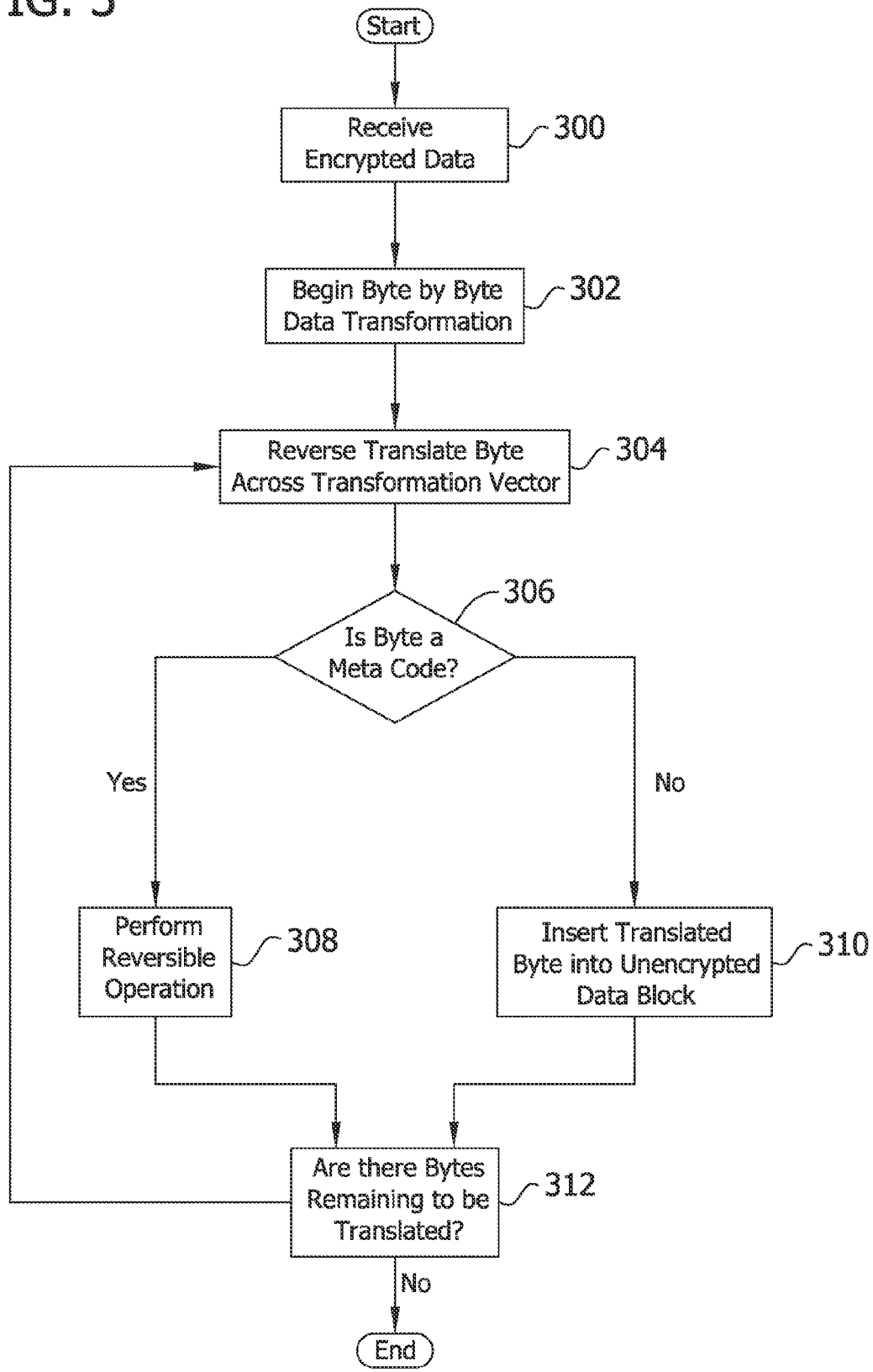
FIG. 3 is a flowchart showing the steps of an exemplary decryption process.

FIG. 3 shows a flowchart of the steps of the decryption method for decrypting the encryption of FIG. 2. At step 300, the encrypted data is received. At step 302, the transformation of that encrypted data begins, translating the data byte by byte. The decryption process uses the same transformation vector and meta byte codes as were used by the encryption process of FIG. 2. At step 304, the next byte in the data is reverse translated across the transformation vector. At step 306, the process determines whether the most recent byte translated is a meta byte code. If so, it indicates a reversible operation is performed 308. If the translated byte is not a meta byte code, the byte is inserted into a block of unencrypted data 310. At step 312, the process determines whether there are more bytes to translate. If so, it returns to step 304 to translate the next byte. If not, the decryption process is complete.

The set of byte codes 108 contains all possible bytes for use in the encryption/decryption process. There are three types of byte codes: user byte codes 110, meta byte codes 112, and dead byte codes 114. The user byte codes 110 represent all the possible bytes used to communicate the actual data in the encryption process. The meta byte codes 112 represent reversible operations that can be performed during the encryption/decryption process. Dead byte codes 114 do not represent either data or reversible operations and are not used during the encryption/decryption process. The inclusion of the dead byte codes 114 creates a larger set of possible choices for someone who is trying to break the encryption, thereby strengthening the encryption. Additionally, during decryption, obtaining a dead byte code from translation of a data byte can be used as an indication that the decryption has failed and that the process should be halted.

An example of a set of byte codes 108 can be seen in FIG. 4. In this example, the data being encrypted is limited to bytes between 0 and 7. In order to implement the encryption method, the set of byte codes 108 is expanded by eight more bytes. Those eight extra bytes include four meta byte codes 112, each representing a reversible operation, and four dead byte codes 114. During encryption, one of the four meta byte codes 112 will be selected to be inserted into the data. Upon decryption, when the process reveals that a meta byte code 112 has been decrypted, the decryption process will perform an operation to reverse the reversible operation performed during encryption. While the meta byte codes come before the dead byte codes in the FIG. 4 example, there is no requirement that the byte codes be in a particular order in the set of byte codes. So long as both the encryption and decryption processes have access to the same set of byte codes, the user, meta, and dead byte codes can be intermingled in any order.

The size of the set of byte codes 108 is equivalent to the size of the transformation vector 106 and the larger the transformation vector 106, the more difficult the encryption will be to break. The set of byte codes 108 in the above example would allow the encryption method to be implemented, but the encryption would be easier to break due to the relatively short size of the transformation vector. A good size for a set of byte codes 108 to be used with this encryption method is 512 bytes. This allows for data to be represented by 256 different user byte codes 110 and leaves 256 byte codes for meta byte codes 112 and dead byte codes 114. It's common for data to be stored in bytes that are made up of eight bits, which allows for 256 unique bytes, so using a 512 byte set of byte codes 108 allows for compatibility with 8-bit byte data. Adding an additional bit allows for an additional 256 combinations, some of which can be assigned to meta byte codes 112 to represent reversible operations, while the majority will be dead byte codes 114.

An example of the transformation vector 106 can be seen in FIG. 5. The transformation vector 106 is made up of the set of byte codes 108, but in a random order. The transformation vector 106 is used to translate each byte of data into another byte. FIG. 5 is an example of a transformation vector using a set of 16 byte codes. When using this transformation vector to translate bytes of data, the process finds the current byte position and changes the byte to the equivalent entry in the transformation vector. For instance, if the byte to translate is a 5, the process will find the 5 position of the transformation vector and change the 5 to the byte that is in that position. In this case, the 5 would be changed to 6. In this way, each of the bytes of data is encrypted by being translated across the transformation vector.

Meta byte codes are used to provide for additional reversible operations during encryption which further complicate and strengthen the encryption. The reversible operations represented by the meta byte codes must be reliably reversible using just the information given in the meta byte code itself upon decryption. There are a large variety of possible reversible operations that can be used to strengthen the encryption so long as the same meta byte codes and operations are available for the decryption process as well. Reversible operations can be used to alter data bytes in addition to translating them across the transformation vector. For instance, a meta byte code might indicate that the next byte be incremented by some amount before it is translated across the transformation vector. Use of this meta byte code would cause random bytes to be incremented throughout the blocks of encrypted data, which adds complexity to the encryption process. For example, assume that the meta byte code '8' in the example set of byte codes in FIG. 4 indicates for the encryption process to increment the next byte by 3 before it is translated across the transformation vector. If the encryption process selects an 8 meta byte code to be inserted before a 3 user byte code, the encryption process would change the 3 user byte code to a 6 before it was translated across the transformation vector. Assuming the transformation vector is the example in FIG. 5, if the process did not increment the 3, it would become a 0. However, since the process has received an 8 meta byte code before the 3, it will increment the 3 by 3 to a 6. The 6 is then translated across the transformation vector to become a 12. The process must also translate the meta byte code and insert it into the encrypted block before the 12 so that the decryption process can determine when a reversible operation was performed and reverse it properly. In this case, the input to the process is " . . . 8, 3 . . . " and the encrypted output will be " . . . 2, 12 . . . ".

When the decryption process reaches the " . . . 2, 12 . . . " portion of the encrypted data, it will translate the bytes across a reverse transformation vector, as seen in FIG. 6, based on the transformation vector used in the encryption process. It will translate the 2 into an 8, which indicates that the next byte has been incremented by 3 before it was translated. The decryption process will translate the 12 across the reverse transformation vector and obtain a 6. It will then decrement the 6 by 3 to obtain a 3, which is the correct user byte code.

Meta byte codes can potentially indicate many other operations that affect the next byte in the sequence. Instead of incrementing, a meta byte code may indicate decrementing. Instead of incrementing by 3, a meta byte code may indicate incrementing by 1 or by 2 or by 5. A meta byte code could indicate that the next byte should be translated across the transformation vector twice rather than once before it is inserted into the encrypted block of data. This is not an exhaustive list of possibilities, and any operation that is reversible during decryption could be indicated by a meta byte code and used to strengthen the encryption.

Some reversible operations may be used that require more information than a single meta byte code. This requires the insertion of additional bytes with the meta byte code to transmit the information about what sort of reversible operation was done. For example, at meta byte code may indicate incrementing by a dynamic amount, where the incrementing amount is chosen randomly when the meta byte code is selected and is represented by a byte or bytes that are inserted directly after the meta byte code. Using the same numbers as the previous example, assume that 8 is a meta byte code that indicates the next user byte code should be incremented by the amount indicated by the byte directly after the meta byte code. For the sake of the example, the input to the process is " . . . 8, 4, 3 . . . ". When the encryption process selects the 8 meta byte code, it also randomly chooses a number indicating how much to increment the following user byte code. In this case, the process will increment the 3 user byte code by 4. The meta byte code and additional byte are both translated across the transformation vector to produce "2, 8" and the 3 is incremented by 4. This produces a 7, which is then translated across the transformation vector to produce a 7. The complete output is " . . . 2, 8, 7 . . . ".

During decryption, the process will translate the 2 across the reverse transformation vector, producing an 8. The process will then translate the 8 to discover how many times the following user byte code was incremented. Translating the 8 across the reverse transformation vector produces a 4. The process then translates the 7 across the reverse transformation vector to produce a 7 and decrements it by 4, producing a 3, which is the correct user byte code.

Some reversible operations may have effects that do not directly alter the user byte codes. For instance, there may be a meta byte code that indicates that the process will jump to a different location in the data block to continue the encryption process. In this case, the order of the data will be altered in a random but reversible way, significantly strengthening the encryption.

Assume that the byte codes in FIG. 7 are the input to the encryption process and that the encryption process uses the transformation vector from FIG. 5. The process begins translating the user byte code input, translating the 5 to a 6 and the 4 to an 8. The process may then insert a meta byte code "9", indicating that the location of the translation process will jump to a different, randomly selected location. In this case, the process may select the 5 location of the input block, which contains a 2 (the locations start from 0). The meta byte code and extra byte are both translated across the transformation vector to produce a 14 and a 6. The process then jumps to the 5 location and begins translation again, translating the 2 to a 10, the 0 to a 13, and the 4 to an 8. The process inserts another 9 meta byte code and randomly chooses the 2 location, which contains a 7 (the process may keep track of which locations have been translated already so that the process does not jump to data that has already been translated and inserted). The translation process continues, translating the 7 to a 7, the 1 to a 1, and the 3 to a 0. The process may then select a 9 meta byte code and jump to the 8 position and translate the 6 to a 12 and the 6 to a 12. The process is then complete. The encrypted data block using the location jump meta byte code would appear as shown in FIG. 8.

The meta byte codes indicating the location jump and the extra bytes indicating the random location have been translated across the transformation vector and included in the encrypted block of data. When the decryption process reaches a meta byte code that indicates that the location was changed during encryption, the decryption process will find which location the next set of data bytes were and translate them back into those locations, allowing the location jump operation to be reversed and the data to be successfully decrypted.

Some reversible operations may require more information to be present outside of the data blocks, including making use of additional key vectors beyond a single transformation vector. The encryption/decryption process can make use of additional key vectors for use as transformation vectors so long as both the encryption process and decryption process have access to the same key vectors. If multiple key vectors are present, a meta byte code could be defined to indicate that further translation be done with a key vector that is different from the current transformation vector. The user byte codes would not be translated consistently throughout the entire data block, significantly complicating and strengthening the encryption. Because the decryption process would also have access to the multiple key vectors, it would detect that the transformation vector was changed based on the meta byte code and so it would be able to switch to the proper reverse transformation vector to continue decryption.

Another example of a reversible operation using multiple key vectors is altering the transformation vector using the key vectors. FIG. 9 shows an example set of multiple key vectors. A meta byte code could indicate that the transformation vector should be translated across a randomly chosen key vector to produce a new transformation vector for use in translating bytes of data. In this case, the decryption process would have access to all of the same key vectors and would be able to translate the reverse transformation vector so as to properly decrypt the bytes of data. Using multiple key vectors to alter the key throughout the encryption process greatly increases the difficulty of breaking the encryption without access to the key information. This allows the complexity of the encryption to increase exponentially as more key vectors are included. The increased cost of the process with more vectors increases linearly with the additional length of the key vectors and the storage cost increases linearly with the addition of more key vectors, allowing for an efficient method of increasing the strength of the encryption while still maintaining its practical usability.

Using the example key vectors in FIG. 9, in order to implement a reversible operation that translates the transformation vector across one of the key vectors, the encryption process may choose a random number between 0 and 3 to determine which of the key vectors the transformation vector will be translated with. Assuming the transformation vector is initially the same as the Key 0 vector, the encryption process would proceed normally as described above. When the encryption process selects the meta byte code that indicates that the transformation vector will be translated across one of the key vectors, the process also selects which one of the key vectors to use and that information is included as an extra byte in the encrypted data block. In this example, assume that the Key 1 vector is chosen to translate the transformation vector.

The elements of the translation of the transformation vector are shown in FIG. 10. For translating the transformation vector, each entry of the transformation vector is treated in the same way that a data byte is treated when translating across the transformation vector. So, the first entry of the transformation vector is 13 and when translated across the Key 1 vector, it becomes 15. When 1, the second entry, is translated across the Key 1 vector it becomes 12. This is done for each entry in the transformation vector and when it is complete, the resulting vector is used as the new transformation vector.

Because the decryption process has access to the same set of key vectors as the encryption process and the number of the key vector is included in the encrypted data, the decryption process can follow along with the changes made to the transformation vector as they were made in the encryption process and use the correct reverse translations to decrypt the data bytes. Because the transformation vector is altered progressively throughout the entire block of data, this reversible operation greatly increases complexity and strength of the encryption.

The examples discussed are not the only ways that multiple key vectors could be used or that the transformation vector could be altered by reversible operations. As long as the operation is reliably reversible on decryption, it can be assigned to a meta byte code and used to strengthen the encryption.

Another use of meta byte codes is a synchronization meta byte code and an end of message meta byte code. The synchronization meta byte code can be used to indicate the beginning of the encrypted data between the encryption process and the decryption process. This allows the decryption process to determine where in a data stream to start decrypting. The end of message meta byte code is used to mark the end of actual data in the unencrypted data block. In some cases, the message being encrypted will be shorter than the data block size used by the encryption. If this is the case, the message is terminated by an end of message meta byte code and then the rest of the block is filled with random bytes. There may also be a predetermined number of random bytes inserted before the message in the data block as well. The inclusion of the random bytes in the data block increases the strength of the encryption by making pattern recognition in the data block more difficult.

Another encryption strengthening measure that may be used during the encryption process is the use of an initial hash vector to alter the location of the bytes within the unencrypted data block before the encryption process begins translating the bytes. Hashing the bytes in the block to other locations also makes pattern recognition within the data block more difficult. The initial hash vector should be as long as the data block being used in the encryption. The initial hash vector may be as long as one of the key vectors or may even be one of the key vectors that are used later in the translation process. This is additional key information that must be shared by the encryption and decryption processes. FIG. 11 shows an example of applying a hash function to input data.

Rather than translating the data across the vector as in the previously described translation process, the hash vector is used to relocate the bytes of the input data to different locations before the translation begins. In FIG. 11, the 4, which is in the 0 position of the input data, is moved to the 13 position according to the first element of the hash vector. The 3 in position 1 remains in position 1. The 6 in position 2 is moved to the 10 position, and so on. The resulting hashed input data is shown in FIG. 11 as hashed input data.

Using the previously described parts of the encryption process, an example of the encryption process will now be presented. Using the exemplary set of byte codes in FIG. 4, the set of user byte codes includes 0-7 for use as data, 8-11 for use as meta byte codes, and 12-15 are dead byte codes. The meta byte code 8 is used as an "end of message" indicator, the meta byte code 9 is used as a "location jump" indicator, the meta byte code 10 is used as a "transformation vector translation" indicator, and the meta byte code 11 is used as a "synchronization" indicator.

The encryption process will use the set of multiple key vectors in FIG. 9. The transformation vector will begin as the Key 0 vector. There will also be an initial hash function used according to the description above that will also use the Key 0 vector. This information is assumed to be available to both the encryption and decryption processes.

A set of 8 user byte codes represents the message to be encrypted: 5, 4, 7, 1, 3, 2, 0, 5. The encryption process initially will prepend the message with 4 random bytes of data and then append an "end of message" meta byte code, and fill the rest of the block with more random bytes. In this case, the block should be 16 bytes long. The resulting block of input data is shown in FIG. 12. The random bytes "4 3 6 6" were prepended to the message and the "end of message" meta byte code 8 was appended, followed by three more random bytes, "6 3 0".

The encryption process uses the Key 0 vector as a hash vector to hash the input data as described above into the hashed input data. This is the same as the exemplary hash function discussed above and shown in FIG. 11.

Once the hashed data is processed, the translation portion of the encryption process begins, which will result in an encrypted data block. In order for the decryption process to synchronize with the encryption process, the first byte of the data block should be a synchronization (SYNC) meta byte code. The encryption process starts with a SYNC meta byte code 11, which is then translated across the transformation vector into a 9 and added to the encrypted data block.

The encryption process starts by selecting a "location jump" (LOC) meta byte code to select the first place in the input data to start the translation. The process pushes a LOC code 9, which is translated to 14, and a random position 14, which is translated to 11. The process then jumps to the 14$^{th}$ position of the hashed input data and begins translating the data across the transformation vector. The process translates a 2, a 0, and a 6 (the process wraps around to the beginning of the data when it reaches the end. The "2 0 6" becomes "10 13 12". The values are inserted into the encrypted data block. The encrypted data block at this point in the process is shown in FIG. 13.

The encryption process selects a "transformation vector translation" (TRAN) meta byte code 10 and a random number indicating which of the key vectors to use for the translation. In this case, the transformation vector is translated across the Key 0 vector. The transformation and Key 0 vectors are the same (FIG. 5). The result of the translation becomes the new transformation vector shown in FIG. 14. The meta byte code 10 and extra data byte 0 are translated into 4 and 13, which are inserted into the encrypted data block.

The encryption process selects a LOC meta byte code 9 and a random data byte 6 to determine the next location in the data to translate. The LOC code 9 and random data byte 6 are translated across the new transformation vector, becoming 11 and 3, and are inserted into the encrypted data block. The process jumps to the 6 position of the hashed input data, which contains a 4. The 4 and 1 are translated to a 2 and 1 and are inserted into the encrypted data block. The encrypted data block at this point is shown in FIG. 15.

The encryption process selects a TRAN meta byte code 10 and a random byte 2 to indicate that the transformation vector should be translated across the Key 2 vector (FIG. 16). The 10 and 2 become 8 and 4 respectively and are inserted into the encrypted data block. The process translates the next data byte, a 5 in the 8 position, to 2 and inserts it into the encrypted data block. The process selects a LOC code 9 and random byte 12 to indicate the next location to translate data. The 9 and 12 become 0 and 7 respectively and are inserted into the encrypted data block. The process then selects a TRAN code 10 and random byte 2 to indicate that the transformation vector should be translated across the Key 2 vector (FIG. 17).

The process translates the next data beginning at position 12 which contains a 7. The 7 becomes 11 and the 4 becomes 12 and they are inserted into the encrypted data block. The encrypted data block at this point is shown in FIG. 18.

The process selects a LOC byte 9 and a random byte 1 to determine that the translation of data bytes will continue at the 1 position. The 9 and 1 become 7 and 6 respectively and are inserted into the encrypted data block. The process translates data bytes starting at the 1 position, translating a 3 into a 4 and another 3 into a 4, both of which are inserted into the encrypted data block.

The process selects a TRAN byte 10 and a random byte 0 indicating that the transformation vector will be translated across the Key 0 vector (FIG. 19). The 10 and 0 become 3 and 8 respectively and are inserted into the encrypted data block. The process translates the next data bytes across the new transformation vector, translating an 8 to 10 and 0 to 2, which are then inserted into the encrypted data block. The process selects a LOC code 9 and a random byte 5 indicating that the translation of data will continue beginning at position 5. The 9 and 5 are translated into 7 and 4 respectively and inserted into the encrypted data block. The 5 position of the hashed input data contains a 6, which is translated to 11 and inserted into the encrypted data block. The encrypted data block at this point is shown in FIG. 20.

The process selects a TRAN code 10 and a random byte 2 indicating that the transformation vector will be translated across the Key 2 vector to form a new transformation vector (FIG. 21). The 10 and 2 are translated to 0 and 6 respectively and are inserted into the encrypted data block. The process selects a LOC code 9 and a random byte 9 indicating that the translation of data bytes will continue at position 9 of the hashed input data. The 9 and 9 are translated to 15 and 15 and inserted into the encrypted data block. The process translates the data bytes beginning at position 9 from 5 to 9, 6 to 0, and 3 to 6, each of the translated bytes being inserted into the encrypted data block. The encryption process is complete and the final state of the encrypted data block is shown in FIG. 22.

The decryption process has access to all of the key information, including the multiple keys, the meta byte codes, the initial hash information, and the number of random bytes inserted before the message data. The decryption process reads the SYNC byte and begins reversing the steps of the encryption process until it has decrypted the entire message.

The encryption/decryption process can include any or all of the meta byte codes that are described herein as well as other types of reversible operations that would allow for successful decryption. This method can be used to encrypt data to send messages to a trusted destination or for protection of data in a single location. The encryption method can be implemented on any sort of computer device having a processor and memory on which to store the instructions for implementing the method. It should be understood that a vast amount of variations on this encryption process exist and that the examples given here are not meant to limit the scope of the invention in any way but rather to aid those skilled in the art with comprehension and implementation of embodiments of the invention.

An alternative implementation of the encryption/decryption process can make use of the described reversible operations for strengthening the encryption without embedding the encrypted meta codes within the encrypted message. This will enable the data to be encrypted without growing the size of the message based on the meta codes. However, without the embedded meta codes, it is necessary for the decrypting party to obtain the information of which reversible operations are being used and when they are being used. In the above description, the decrypting party knows what the meta byte codes are and, when a meta byte code is reached, the correct action can be taken to reverse the operation.

An alternative implementation makes use of a pseudorandom number generator that requires a random seed value for initialization. A pseudorandom number generator using a random seed value will generate seemingly random values based on the seed value. However, if another party uses the same random number generator program and enters the same random seed value, they will generate the same seemingly random values in the same order. This type of pseudorandom number generator is well known in computer science and often used in different types of cryptography. Using a pseudorandom number generator like this, the encrypting party can cause reversible operations to occur at seemingly random places throughout the encryption process, much like with the meta codes. At the same time, if the decrypting party knows what number generator program and random seed value was used by the encrypting party, the decrypting party can generate the same random values in the same order. Using these random values, the decrypting party can determine which reversible operations were used and when they were used and reverse the operations.

This process requires that the random seed value be shared between the parties in a secret way in much the same way that the transformation vectors and meta code values are shared. The random seed value becomes a part of the "shared key" information that both parties must have. Advantageously, the message size will not become inflated by the insertion of meta byte codes using this method.

An encrypting party can also determine with what frequency a reversible operation or operations occur as well as with what frequency the data bytes are translated. These rates must also be shared with the decrypting party in a secret way. Changing the frequency of the reversible operations has a variety of effects on the encryption process. If the frequency of reversible operations is high, it may slow down the encryption process by spending extra time executing the reversible operations. On the other hand, if the frequency is very low, the encryption may not be as strong and more patterns may be noticeable. Setting the frequency of the reversible operations does not necessarily result in an operation occurring precisely every set number of characters translated, but rather it has to do with the probability of the reversible operation occurring. For instance, if the frequency of an operation was set to ¼, then the encryption program may generate a random value from 1, 2, 3, or 4, and if the value is 1, then it would execute a reversible operation. The encryption program checks whether to execute a reversible operation each time it translates a user byte code, so that the operations can occur at any time during the process. In the case of the frequency being set to ¼, a reversible operation may be executed several times in a row, or it may not occur for five or more user byte codes, but the average frequency of reversible operations will be essentially once every four user byte codes. Other frequency rates can be used based on the preferences of the user. The random values being generated in the frequency calculation are also generated by the pseudorandom number generator discussed above, so a decrypting party with the random seed value and frequency rate values will be able to properly decrypt the data and determine when to reverse an operation.

Another alternative method of determining when to execute a reversible operation may include the use of a state machine with a randomly generated set of states. For instance, each state of the state machine may be assigned to either encrypt a byte of user data and add it to the encrypted data or cause a reversible operation to occur. As described above, both the encrypting party and decrypting party are aware of the information necessary to generate the same pseudo random values, so both parties are aware of how the state machine has been created. Additionally, the state machine may be combined with the idea of having a frequency rate of an operation occurring, such that when an operation state occurs, the system will check the frequency rate as described above to determine if the operation is actually executed.

TABLE 1

|   | 1 | 2 | 3 | 4 | 5 | 6 |
|---|---|---|---|---|---|---|
| 1 | O | U | U | O | O | U |
| 2 | U | U | O | O | O | U |
| 3 | U | O | O | O | U | U |
| 4 | O | O | O | U | U | U |
| 5 | O | O | U | O | U | U |
| 6 | U | O | O | O | U | U |

Table 1 above shows an exemplary state machine for determining when to execute reversible operations. Both parties must know the state machine information, so this becomes a further part of the key. This table may also be generated initially using the agreed upon pseudo-random generator and random seed value. The system then generates random values to determine the next state, and as it transitions to the state, it takes the action that is assigned to that state. In Table 1, the rows represent the current state and the columns represent the next state. An 'O' represents the execution of a reversible operation and the 'U' represents the encryption of user data. A state machine may also contain multiple types of reversible operations, which would each be assigned to their own transitions on the state machine table.

For example, assume that the following sequence of states is generated by the encryption process: 1, 5, 4, 4, 5, 6, 1, 3, 2. Starting from state 1, the process transitions to state 5. They system determines that the (1, 5) cell of the state machine contains an 'O'. As a result, the system executes a reversible operation. The system transitions from state 5 to state 4, determining that the (5, 4) cell contains an 'O' again. Another reversible operation is performed. The system transitions from state 4 to state 4, determining that the (4, 4) cell contains a 'U'. A user byte is then encrypted and inserted into the encrypted data block. Following this process, the system performs 4 more user byte encryptions in a row, and then one more reversible operation. The operational sequence that results from the example sequence of states is as follows: O, O, U, U, U, U, U, O.

Using this state machine technique, the frequency of reversible operations can be affected by altering how many state transitions result in reversible operations. In the above example, the number of 'O' transitions and 'U' transitions is even, but in practice, that ratio could be altered to decrease the number of reversible operations per user byte encrypted. Additionally, when a transition occurs, the process may also apply the desired frequency rate as described above to determine whether the action of that transition is actually taken. For instance, if the frequency rate of a reversible operation is ¼, there would be a 25% chance that a reversible operation would be executed for each transition that indicated a reversible operation.

Embodiments of the present invention may comprise a special purpose or general purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 23:
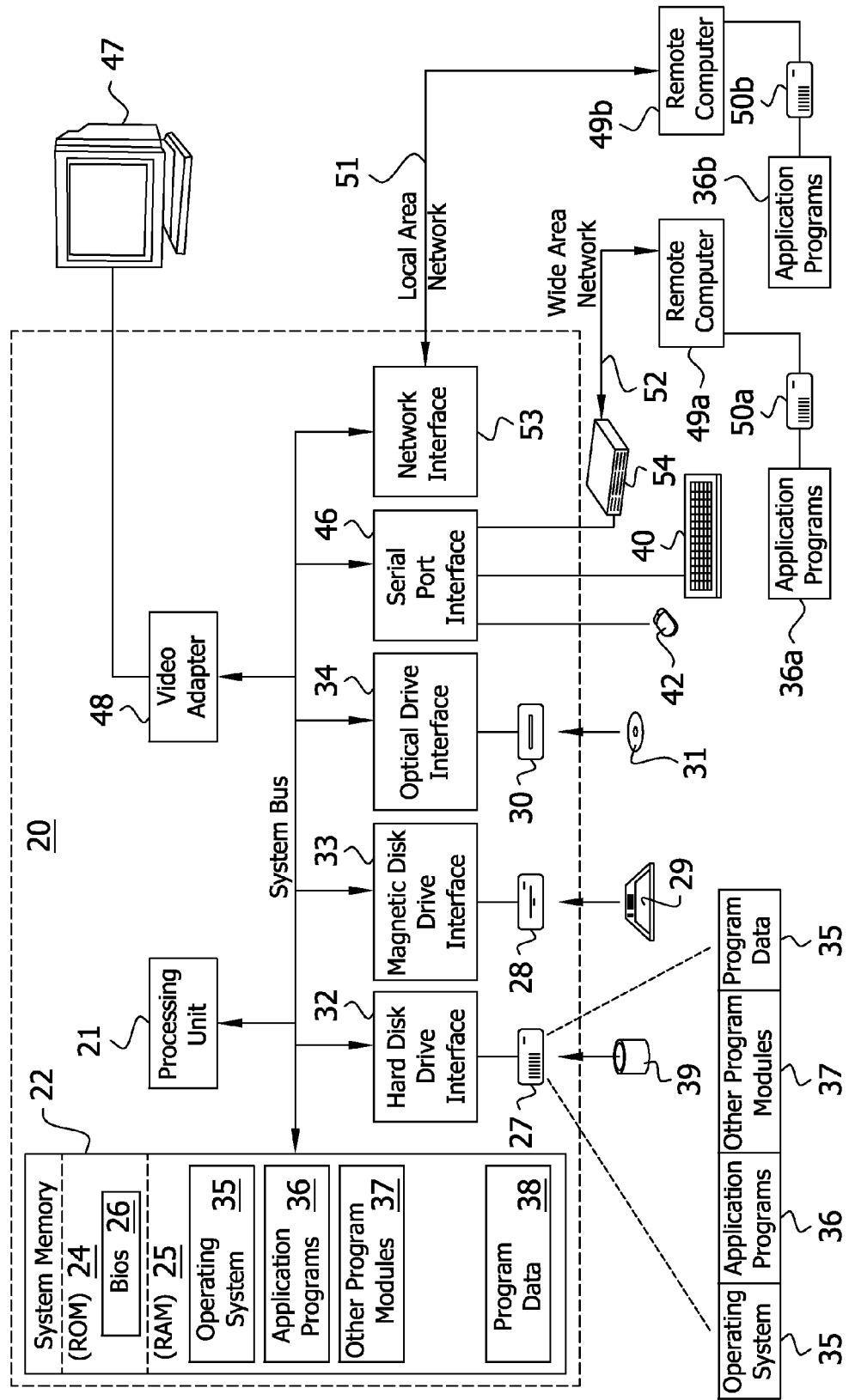
FIG. 23 is a block diagram illustrating an example of a suitable computing system environment in which aspects of the invention may be implemented.

FIG. 23 and the following discussion are intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 23, an exemplary system for implementing aspects of the invention includes a general purpose computing device in the form of a conventional computer 20, including a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help transfer information between elements within the computer 20, such as during start-up, may be stored in ROM 24.

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer-executable instructions, data structures, program modules, and other data for the computer 20. Although the exemplary environment described herein employs a magnetic hard disk 39, a removable magnetic disk 29, and a removable optical disk 31, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 39, magnetic disk 29, optical disk 31, ROM 24, and/or RAM 25, including an operating system 35, one or more application programs 36, other program modules 37, and program data 38. A user may enter commands and information into the computer 20 through keyboard 40, pointing device 42, or other input devices (not shown), such as a microphone, joy stick, game pad, satellite dish, scanner, or the like. These and other input devices are often connected to the processing unit 21 through a serial port interface 46 coupled to system bus 23. Alternatively, the input devices may be connected by other interfaces, such as a parallel port, a game port, or a universal serial bus (USB). A monitor 47 or another display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as remote computers 49a and 49b. Remote computers 49a and 49b may each be another personal computer, a server, a router, a network PC, a peer device or other common network node, and typically include many or all of the elements described above relative to the computer 20, although only memory storage devices 50a and 50b and their associated application programs 36a and 36b have been illustrated in FIG. 23. The logical connections depicted in FIG. 23 include a local area network (LAN) 51 and a wide area network (WAN) 52 that are presented here by way of example and not limitation. Such networking environments are commonplace in office-wide or enterprise-wide computer networks, intranets and the Internet.

When used in a LAN networking environment, the computer 20 is connected to the local network 51 through a network interface or adapter 53. When used in a WAN networking environment, the computer 20 may include a modem 54, a wireless link, or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing communications over wide area network 52 may be used.

In operation, a system embodying aspects of the invention receives data to be encrypted, defines a set of byte codes associated with the data, and stores a transformation vector defined from the set of byte codes. The system retrieves the transformation vector from the memory and transforms a block of the data from the data to be encrypted. The transformation vector includes one of each of the user byte codes, the meta byte codes, and the dead byte codes arranged in a random order. Further, transforming includes translating values of the user byte codes from the block of data across the transformation vector, randomly selecting one or more meta byte codes from the defined meta byte codes, performing the reversible operations indicated by the selected meta byte codes during the translation of the values of the user byte codes from the block of data, translating the values of the selected meta byte codes across the transformation vector, inserting the translated values of the user byte codes into an encrypted block of data, and inserting the translated values of the selected meta byte codes into the encrypted block of data.

To decrypt the data, the system receives previously encrypted data, stores, in a memory, a set of byte codes associated with the data to be decrypted that were used to encrypt the data to be decrypted, and defines a set of byte codes, namely, user byte codes, meta byte codes, and dead byte codes. The system also stores a transformation vector defined from the set of byte codes in the memory. In this instance, the transformation vector includes one of each of the user byte codes, the meta byte codes, and the dead byte codes arranged in a random order and was used to encrypt the data to be decrypted. Further, the system retrieves the transformation vector from the memory and transforming a block of data from the data to be decrypted. Transforming includes translating values of the user byte codes from the block of data across the transformation vector. The translating reverses a translation of the user byte codes during encryption and translates values of the meta byte codes from the block of data across the transformation vector. And the translating reverses a translation of the meta byte codes during encryption to perform the reversible operation indicated by the meta byte codes and insert the translated values of the user byte codes into a decrypted block of data.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of encrypting data, comprising:
receiving, by a computer, a block of data to be encrypted;
defining, by the computer, a set of byte codes associated with the block of data, said defining comprising:
defining one or more user byte codes, said user byte codes being representative of the block of data;
storing, a transformation vector defined from the set of byte codes in a memory, said transformation vector including a plurality of the byte codes arranged in a random order;
retrieving, by the computer, the transformation vector from the memory;
transforming, by the computer, the block of data, said transforming comprising:
translating values of the user byte codes from the block of data across the transformation vector;
determining whether to perform a reversible operation between translations of values of each of the user byte codes from the block of data across the transformation vector;
performing reversible operations during translation of the values of the user byte codes from the block of data, the reversible operations being performed between translations of individual byte codes wherein each reversible operation alters the translations of byte codes that occur after the reversible operation is performed; and
inserting the translated values of the user byte codes into an encrypted block of data.

2. The method of claim 1, further storing a seed value, said seed value being used to generate random numbers, said random numbers being used to cause the reversible operations to occur randomly between the translations of individual byte codes.

3. The method of claim 1, wherein the reversible operations occur at a set frequency.

4. The method of claim 1, wherein a reversible operation adds a value to each byte code of the transformation vector.

5. The method of claim 1, further comprising generating a random sequence of states, said sequence of states being used to determine the order in which values are translated and reversible operations are performed.

6. The method of claim 1, further comprising using a hash function on the block of data to be encrypted before it is transformed.

7. A non-transitory computer-readable medium having computer-executable instructions stored thereon for encrypting a block of data, said instructions, when executed by a computer, causing the computer to perform a method comprising:
defining a set of byte codes, said defining comprising:
defining one or more user byte codes, said user byte codes being representative of the block of data; and
defining a transformation vector from the set of byte codes, said transformation vector including a plurality of the byte codes arranged in a random order;
transforming the block of data, said transforming comprising:
translating values of the user byte codes from the block of data across the transformation vector;
determining whether to perform a reversible operation between translations of values of each of the user byte codes from the block of data across the transformation vector;
performing reversible operations during translation of the values of the user byte codes from the block of data, the reversible operations being performed between translations of individual byte codes wherein each reversible operation alters the translations of byte codes that occur after the reversible operation is performed;
inserting the translated values of user byte codes into an encrypted block of data.

8. The computer-readable medium of claim 7, the method performed further comprising storing a seed value, said seed value being used to generate random numbers, said random numbers being used to cause the reversible operations to occur randomly between the translation of individual byte codes.

9. The computer-readable medium of claim 7, wherein the reversible operations occur at a set frequency.

10. The computer-readable medium of claim 7, wherein a reversible operation adds a value to each byte code of the transformation vector.

11. The computer-readable medium of claim 7, the method performed further comprising generating a random sequence of states, said sequence of states being used to determine the order in which values are translated and reversible operations are performed.

12. The computer-readable medium of claim 7, further comprising computer-executable instructions for using a hash function on the block of data to be encrypted before it is transformed.

13. A method of decrypting data, comprising:
receiving, by a computer, a block of data to be decrypted, said data having been previously encrypted;
storing, in a memory, a set of byte codes associated with the block of data to be decrypted, said set of byte codes having been used to encrypt the block of data to be decrypted;
defining one or more user byte codes of the set of byte codes, said user byte codes being representative of the block of data to be decrypted; and
storing, a transformation vector defined from the set of byte codes in the memory, said transformation vector including a plurality of the byte codes arranged in a random order, said transformation vector having been used to encrypt the block of data to be decrypted;
retrieving, by the computer, the transformation vector from the memory;
transforming, by the computer, the block of data, said transforming comprising:
translating values of the user byte codes from the block of data across the transformation vector, said translating reversing a translation of the user byte codes during encryption;

determining whether to reverse a reversible operation between translations of values of each of the user byte codes from the block of data across the transformation vector;

reversing reversible operations, the reversible operations being reversed between translations of individual byte codes wherein each reversible operation alters the translations of byte codes that occur after the reversible operation is performed; and inserting the translated values of the user byte codes into a decrypted block of data.

14. The method of claim 13, further storing a seed value having been used in the encryption of the block to be decrypted, said seed value being used to generate random numbers, said random numbers being used to reverse the reversible operations that occurred during the encryption of the block to be decrypted.

15. The method of claim 14, wherein the seed value is used to generate random numbers, said random numbers being used to generate a sequence of states, said sequence of states determining the order in which values are translated and reversible operations are performed.

16. The method of claim 13, wherein reversing a reversible operation comprises subtracting a value from each byte code in the transformation vector.

17. The method of claim 13, further comprising reversing a hash function on the decrypted block of data after it is transformed, said hash function having been used during the encryption of the date to be decrypted.

* * * * *